Patented Mar. 8, 1949

2,463,653

UNITED STATES PATENT OFFICE 2,463,653

PRODUCTION OF DDT OF IMPROVED QUALITY

Michael Sveda, Cleveland, Ohio, assignor to E. I. du Pont de Nemours & Company, Wilmington, Del., a corporation of Delaware No Drawing. Application June 27, 1945, Serial No. 601,945

4 Claims. (Cl. 260—649)

This invention relates to processes for producing DDT of improved quality and is more particularly directed to processes in which at least a part of the ortho, para isomer present in a mixture of ortho, para and para, para isomers of DDT is sulfonated.

Dichloro diphenyl trichloroethane, commonly known as "DDT" consists principally of a mixture of two isomers. One isomer, designated 2, 2 bis (p-chlorophenyl), 1,1,1-trichloroethane and having a melting point of about 107 to 108° C., is usually referred to as the para, para isomer. The other isomer, designated 2(p-chlorophenyl), 2(o-chlorophenyl), 1,1,1-trichloroethane and having a melting point of about 73 to 74° C., is known as the ortho, para isomer.

Because commercial DDT is a mixture of products, it melts over a wide range, beginning at approximately 55° C. and becoming completely fluid at approximately 95° C. This wide melting range makes the determination of a melting point extremely difficult and, in general, unsatisfactory. Reproducible results, however, can be obtained if a set point is taken instead of a melting point, and the ordinary commercial DDT has a set point in the range of 87 to 90° C. The set point of commercial DDT is an index of its quality, and it is generally believed that the set point is a direct measure of the proportion of para, para isomer present.

It is desirable that DDT should have a high set point because there are indications that the para, para isomer is more toxic to insects and less toxic to higher animals and plants than the other products present in commercial DDT and because a high setting material is much less likely to cake in the form of a 5 to 10% dust in an inert medium such as talc. The latter fact is particularly important where DDT compositions are used in hot climates.

In the past it has been virtually impossible to produce DDT having a set point even as high as 92° C. without resorting to crystallization from a solvent such as chlorobenzene or ethanol. DDT is commonly made by effecting reaction between chloral or chloral hydrate and monochlorobenzene in the presence of sulfuric acid, the acid strength being less than about 98% $H_2SO_4$. This gives a product containing about 65% of para, para isomer, the balance being largely ortho, para isomer. Separating these isomers by such methods as fractional crystallization from a solvent involves a substantial investment in equipment, considerable expenditure of labor, and the hazards and inconveniences which accompany the handling and storage of solvents and mother liquors.

It is an object of this invention to provide processes for producing DDT of improved quality. Another object is to provide processes for producing DDT having a set-point higher than about 90° C. without purifying by means of fractional crystallization from a solvent. Another object is to provide processes for separating at least a portion of the ortho, para isomer from a mixture of ortho, para and para, para isomers of DDT. Other objects will appear hereinafter.

The foregoing and other objects of this invention are accomplished by processes in which at least a part of the ortho, para isomer present in a mixture of ortho, para and para, para isomers of DDT is sulfonated.

The processes of this invention accomplish the desired result of improving the set point of DDT without resort to expensive solvent crystallization procedures. As usually made, DDT is obtained associated with a relatively high strength sulfuric acid. According to previous practices this acid is washed out with water before the DDT is isolated. One simple method for removing the sulfonated material from the para, para isomer according to the present invention is by washing with water. Hence, as to such washing step, the present processes involve no extra expense. Moreover, it has been found according to the present invention that sulfonation of at least part of the ortho, para isomer can readily be accomplished by suitably increasing the final sulfuric acid strength. The amount of new acid consumed is only that required for such fortification. These advantages combine to provide a process for producing DDT having a maximum set point at a minimum of expense.

A process of this invention may be used to improve the quality of any DDT containing both ortho, para and para, para isomers. Processes of the invention may be applied with particular benefit to a product obtained by effecting reaction between chloral and monochlorobenzene in the presence of concentrated sulfuric acid. It should be noted that monochlorobenzene is easily sulfonated, and hence any excess should be removed prior to raising the acid strength to greater than 99% so as to avoid wasting the monochlorobenzene and the acid which would otherwise be consumed in sulfonating it.

The sulfonation of the ortho, para isomer may be accomplished using an acid having a strength of from 99 to 104.5% by weight, calculated as $H_2SO_4$. To build the acid up to this strength oleum, concentrated chlorosulfonic acid, or liquid $SO_3$ may be added.

The acid strength herein referred to as being from 99 to 104.5% $H_2SO_4$ is based on the organic-free acid present, that is, the sulfuric acid not chemically combined with any other component. The sulfonic acid group of sulfonated monochlorobenzene is not included in expressing the acid strength.

The preferred temperature to use in the sulfonation step varies inversely with the concentration of the acid. Thus with an acid strength of 100% $H_2SO_4$ a temperature of from 30 to 40° C. may be preferred, while using an acid strength of 102% $H_2SO_4$ the temperature may preferably be from 15 to 20° C.

To maintain the temperature in the desired range, cooling may be provided.

After sulfonation of at least a portion of the ortho, para isomer has taken place the sulfonated material may be separated from the non-sulfonated DDT by any desired means. For instance, it may be washed out with water. This is preferably accomplished by introducing water with cooling, such as by adding ice to the mixture, since otherwise the heat of dilution of the sulfuric acid will raise the temperature undesirably. Another method of separation consists in extracting the non-sulfonated DDT with a solvent such as monochlorobenzene or carbon tetrachloride.

The purified product may be dried and ground to put it in condition for use as an insecticide. The product contains the para, para isomer of DDT in sufficient proportion to give a set-point above about 90° C.

The practice of this invention will be better understood by reference to the following illustrative examples:

Example I

Seventy grams of commercial DDT having a set point of 88° C. was stirred with 140 grams of 100% sulfuric acid at 31 to 36° C. for one hour. The reaction mixture was poured onto ice, and after filtration, was thoroughly washed with hot water by decantation. The product, after drying under vacuum, weighed 59.5 grams (an 85% recovery) and had a set point of 97.1° C., a very significant improvement.

Example II

Seventy grams of commercial DDT having a set point of 88° C. was stirred with 140 grams of 102.25% sulfuric acid (10% oleum) for 45 minutes at 15 to 20° C. and worked up as described in Example I, except that the washing was done by slurrying and filtration, since the product had such a high set point that no fusion occurred in water even at 97° C. After drying under vacuum, the product weighed 48.5 grams (69.4% recovery) and melted in the range of 100 to 106° C. (The set point is difficult to determine above 100° C., but an approximate value for this material is 102° C.).

Example III

A 370 gram portion of recycled acid from a previous run was added to a solution of 147.5 grams of chloral and 372 grams of monochlorobenzene over a ½ hour period, the temperature being maintained at 30° C. throughout the addition. Then over a 4.5 hour period, the temperature again being maintained at 30° C., there was added 571 grams of 35% oleum (i. e. 100% $H_2SO_4$ containing 35% dissolved $SO_3$). The final acid strength was 99.8% $H_2SO_4$ on an organic-free basis. After a holding period of ½ hour at 30° C. with agitation, the solid product was separated from the acid, washed thoroughly with water, and dried under vacuum.

The product, obtained in 66% yield based on the original chloral employed, had a set point of 100.4° C.

While in the foregoing description of this invention certain processes have been shown by way of illustration, it will be understood that without departing from the spirit of the invention one skilled in the art may employ variations of such processes.

I claim:

1. In a process for producing DDT having a set point higher than about 90° C. the steps comprising sulfonating, with sulfuric acid having a strength of from 99 to 104.5% $H_2SO_4$, at least a part of the ortho, para isomer present in a mixture comprising ortho, para and para, para isomers of DDT and separating the sulfonated material from the para, para isomer.

2. In a process for producing DDT having a set point higher than about 90° C. the steps comprising sulfonating, with sulfuric acid having a strength of from 99 to 104.5% $H_2SO_4$, at least a part of the ortho, para isomer present in a mixture comprising ortho, para and para, para isomers of DDT and washing out the sulfonated material from the para, para isomer with water.

3. In a process for producing DDT having a set point higher than about 90° C. the steps comprising effecting reaction between chloral and monochlorobenzene in the presence of concentrated sulfuric acid having a strength less than 99 per cent $H_2SO_4$, whereby a product comprising a mixture comprising ortho, para and para, para isomers of DDT is produced, increasing the acid strength to from 99 to 104.5 per cent $H_2SO_4$, whereby at least a portion of the ortho, para isomer is sulfonated and rendered water-soluble, and washing the sulfonated material and sulfuric acid out of the product with water.

4. In a process for producing DDT having a set point higher than about 90° C. the steps comprising sulfonating, with sulfuric acid having a strength of from 99 to 104.5% $H_2SO_4$ and at a temperature of about from 15 to 40° C., at least a part of the ortho, para isomer present in a mixture comprising ortho, para and para, para isomers of DDT and washing out the sulfonated material from the para, para isomer with water.

MICHAEL SVEDA.

REFERENCES CITED

The following references are of record in the file of this patent:

UNITED STATES PATENTS

| Number | Name | Date |
|---|---|---|
| 2,329,074 | Muller | Sept. 7, 1943 |

OTHER REFERENCES

Iris et al., "Rev. Inst. Salubridad Enfermedad Trop." (Mex.) vol. 5, page 73 (1944).

Callaham "Chemical & Metallurgical Engineering," vol. 51, pages 109–114 (1944).

Haller et al., "Jour. Am. Chem. Soc.," vol. 67, pages 1591–1593 (1945).

Brand et al., "Ber. deut. Chem.," vol. 72, page 1031 (1939).